Patented Mar. 20, 1928.

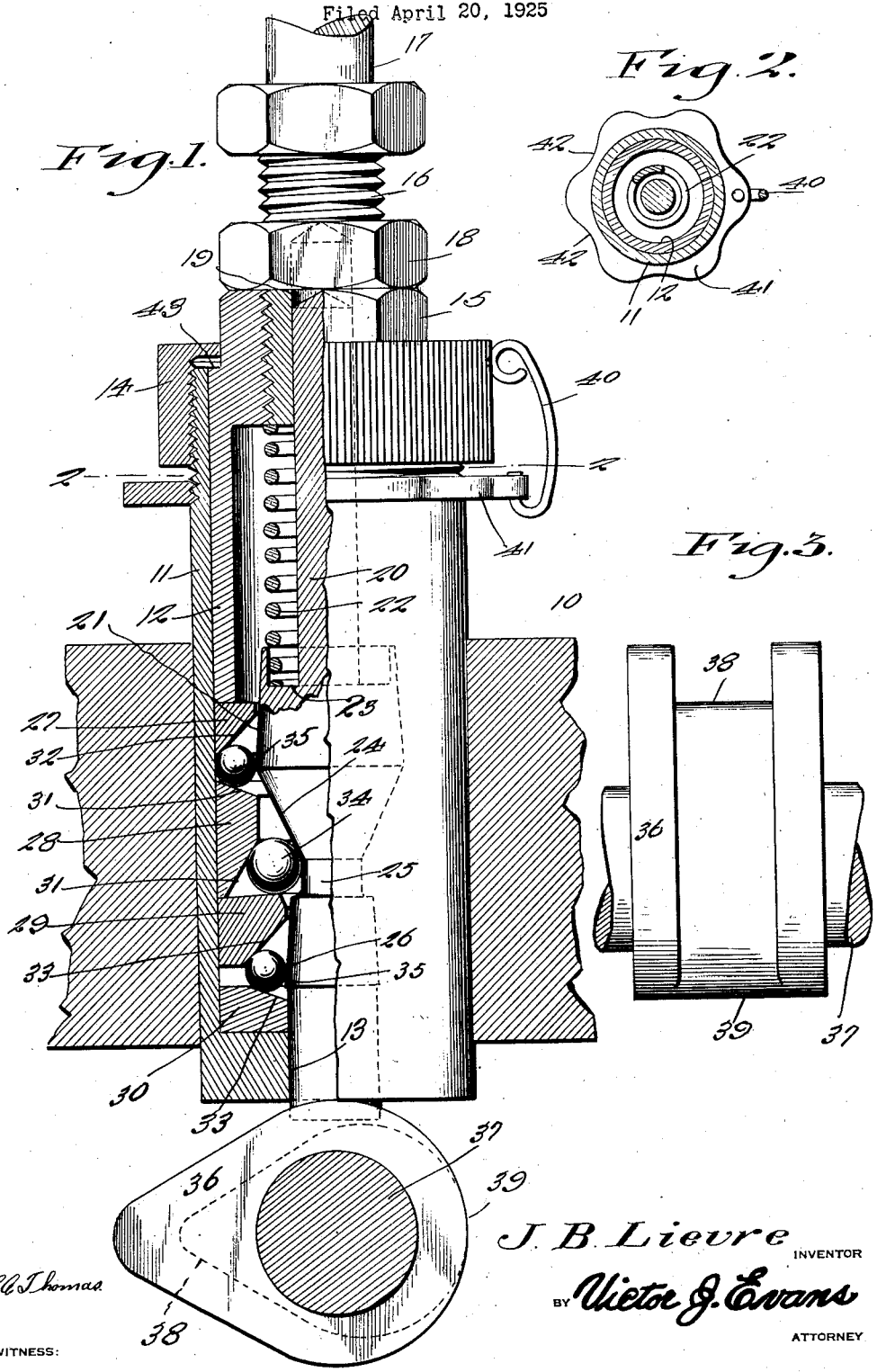

1,663,345

UNITED STATES PATENT OFFICE.

JOSEPH BENJAMIN LIEVRE, OF MEXICO, MEXICO, ASSIGNOR OF ONE-TENTH TO L. D. ORNSBY, OF BEXAR COUNTY, TEXAS.

PUSH ROD.

Application filed April 20, 1925. Serial No. 24,655.

This invention relates generally to valve actuating mechanisms for internal combustion engines and similar mechanisms and has particular relation to valve stem push rods.

As is well known, the function of the push rod is to transmit movement from the cam to the valve for the purpose of opening the latter and permit the gases to enter and leave the combustion chamber of the engine. In order to obtain maximum efficiency, the valves must open their fullest extent and must also be permitted to properly seat and to accomplish this, the push rods must be accurately adjusted. If adjustment is too close, the valves will not properly seat and play between the push rods and valve stems will result in a noisy engine. Proper adjustment is difficult owing to expansion and contraction of the valve stems due to varying temperatures of the engine and to wear, so that even though the valves are adjusted properly, they quickly become noisy after operating for a short period.

It is the purpose of the present invention to eliminate these and other disadvantages by providing means for automatically maintaining proper engagement between the valve stem and the push rod, so that play between these parts will be eliminated irrespective of the temperature of the engine or change in the length of the parts due to wear and at the same time proper operation of the valves will be assured, so that the efficiency of the engine will not be reduced.

With the above and other objects in view, the invention further includes the following novel features and details of construction, to be hereinafter more fully described, illustrated in the accompanying drawings and pointed out in the appended claims.

In the drawings:—

Figure 1 is an elevation partly in section showing a push rod constructed in accordance with the invention, the view being on an enlarged scale.

Figure 2 is a section on a reduced scale, the view being taken substantially on the line 2—2 of Figure 1.

Figure 3 is an edge view of the actuating cam.

Referring to the drawings in detail wherein like characters of reference denote corresponding parts, the reference character 10 indicates a push rod guide within which is operatively mounted a push rod constructed in accordance with the invention. This rod comprises an outer sleeve 11 and an inner sleeve 12, the latter being longitudinally slidable in the former. The outer sleeve is provided in its lower end with an opening 13 and at its upper end with a threadedly adjustable collar 14, a wrench receiving extension 15 provided on the sleeve 12, extending through this collar. The extension 15 of the inner sleeve 12 has a threaded engagement with an adjustable stem 16 whose outer end engages the adjacent end of a valve stem, a portion of which is indicated at 17. The stem 16 is held in adjusted position by means of a lock nut 18, as is usual in devices of this character.

The stem 16 is provided with a bore or socket 19, the walls of which provide a guide for a relatively movable inner stem 20. This stem 20 is provided intermediate its ends with an upwardly and inwardly tapered portion 21 having a greater diameter than the upper part of said stem and this upper part is surrounded by a spring 22 whose upper end bears against the upper end of the sleeve 12. The lower end of the spring 22 is received within an annular seat 23 and bears against said seat so that its action is to force the inner sleeve 12 and the inner stem 20 in opposite directions. The stem 20 is further provided with a downwardly and inwardly tapered portion 24 which is joined by a neck 25 with an upwardly and inwardly tapered portion 26, the said portions 21 and 26 being hereinafter referred to as locking sections, while the tapered portion 24 will be hereinafter referred to as a take-up section.

The inner sleeve 12 terminates short of the bottom of the sleeve 11 and located within the sleeve 11 below the sleeve 12 is a plurality of rings 27, 28, 29 and 30. The ring 28 is provided with reversely inclined cam edges 31, while the ring 27 is provided with an inclined cam edge 32 which is opposed to one of the inclined edges of the ring 28. The rings 29 and 30 are provided with opposed inclined cam edges 33. The space provided by these inclined cam edges accommodates balls 34 and 35, whose purpose will be later explained.

Cooperating with the push rod is a cam 36 which is mounted upon a cam shaft 37 and operated in the usual or any desired manner. This cam 36 is provided with a groove 38 whose depth diminishes so as to be flush with the edge of the cam at the point indicated at 39. The width of the groove is of a size to accommodate the inner stem 20.

The push rod is initially adjusted through the adjustment of the stem 16, final accurate adjustment being effected by adjusting the collar 14. To accomplish this, the collar 14 is screwed upward and the cam 36 positioned so that the point 39 engages the sleeve 11 and stem 20, the lower end of the stem and sleeve being flush. The collar 14 is then adjusted inward until it engages the shoulder on the upper end of the sleeve 12 which determines the point of engagement between the sleeve and collar during the upward movement of the push rod. The stem 16 is as stated, held in adjusted position by the lock nut 18, while the collar 14 is held in adjusted position by means of a spring 40 which is carried by a ring 41 which is mounted upon the outer sleeve 11. This ring 41 has its edge provided with depressions 42 so as to form convenient finger holds when adjusting the collar 14.

The spring 22 exerts an upward pressure upon the upper end of the sleeve 12 and keeps the stem 16 engaged with the valve stem 17 so as to eliminate play. As the tendency of the spring 22 is to force the inner stem 20 downward, the take-up section 24 of this stem will force the balls 34 outward and act to separate the rings 28 and 29. Since the ring 29 is held against relative downward movement the ring 28 will be forced upward and will force upward the sleeve 12 and thus compensate for any play between the push rod and valve stem 17. Any play existing between the stems 16 and 17 will thus be taken up.

Downward movement of the inner stem 20 under the action of the spring 22 will permit the balls 35 to ride upward upon the locking sections 21 and 26 of the stem 20, outward movement of the balls 34, due to the section 24 descending, will force the rings 27 and 28 and the balls 35 which separate these rings, upward. The sleeve 12 will then be securely locked against any downward movement independent of the sleeve 11. This locking action is due to the fact that the balls 35 are wedged between the rings 29—30 and 27—28 and the surfaces 26 and 21 respectively, and the balls 35 are not released until the stem 20 moves independently upward. The balls 34 are wedge between the surface 24 and the rings 28—29 and are not released until the stem moves upward. As the push rod moves upward due to the operation of the cam 36, this upward movement is resisted by the valve spring and the resistance exerted upon the valve by the remaining gases in the combustion chamber of the engine, the locking action of the balls 35 on the locking sections 21 and 26 of the stem 20 resisting any independent downward movement of the inner sleeve 12. The parts are thus locked against relative movement during the up stroke of the push rod. The valve will thus be given its maximum amount of lift.

As the cam rotates, the extended lower end of the inner stem 20 remains within the groove 38 and engages the bottom of this groove at a point determined by the amount of its projection, the stem being held in projected position by engagement of the balls 35 with the locking sections 26. When the stem 20 engages the bottom of the groove 38, this stem is independently lifted so that the balls 34 will be permitted to move inward to release the ring 28 and permit the latter to move downward. This movement permits of the release of the balls 35 from the locking sections 21 and 26.

The push rod may be rendered non-automatic, that is, the parts may be locked against relative movement by securing the collar 14 tightly down upon the upper end of the outer sleeve 11 and consequently upon an annular shoulder 43 provided upon the inner sleeve 12.

It will be apparent from the foregoing description and accompanying drawings, that the invention provides a push rod which will eliminate noise due to play between the push rod and valve stem; a push rod which is automatically adjustable to take up play due to wear and other causes and will permit full travel and proper seating for the valve with the result that an engine equipped with push rods of this character will operate with a maximum power, a minimum amount of noise and vibration.

The invention is susceptible of various changes in its form, proportions and minor details of construction and the right is herein reserved to make such changes as properly fall within the scope of the appended claims.

Having described the invention what is claimed is:—

1. In a valve operating mechanism, a longitudinally extensible push rod adapted to have one end engage the stem of a valve, a cam engaging the opposite end of the rod, means to automatically extend the rod to force the end of said rod into engagement with the valve stem, ball and cam clutch mechanism to resist contraction of the rod during the opening movement of the valve and to release said resisting means during the closing movement of the valve.

2. In a valve operating mechanism, a longitudinally extensible push rod adapted to have one end engage the stem of a valve, a cam engaging the opposite end of the rod, means to automatically extend the rod to force the end of said rod into engagement with the valve stem, means controlled by the spring valve to resist contraction of the rod during the opening movement of the valve and means controlled by the cam to release said resisting means during the operation of the valve.

3. In a valve operating mechanism, a push rod comprising inner and outer relatively movable sleeves, adjustable means carried by one of the sleeves to engage the stem of a valve, means to yieldingly force the stem engaging means outward, means controlled by the resistance of the spring of the valve to lock the stem engaging means against reverse movement during the opening movement of the valve and means to release the locking means during the closing movement of said valve.

4. In a valve operating mechanism, a push rod comprising inner and outer relatively movable sleeves, means carried by the inner sleeve to engage the stem of a valve, yieldable means to force the inner sleeve outward, a plurality of relatively movable rings having inclined edges and defining annular grooves, balls within the grooves, movable means controlled by the pressure of the spring of the valve during the opening movement of the latter and yieldingly engaging certain of the balls to move the latter outward and position the rings to hold the inner sleeve against inward movement, means included in the movable ball engaging means to lock the rings in position and means to move the ball engaging means and release said rings during the closing movement of the valve.

5. In a valve operating mechanism, a push rod comprising inner and outer relatively movable sleeves, means carried by the inner sleeve to engage the stem of a valve, yieldable means to force the inner sleeve outward, a plurality of relatively movable rings having inclined edges and defining annular grooves, balls within the grooves, a stem movable within the push rod and controlled by the pressure of the spring of the valve during its opening movement to engage certain of the balls and move the latter outward and position the rings to hold the inner sleeve against inward movement, means included in the ball engaging stem to lock the rings in position and means to actuate said stem and release the rings during the closing movement of the valve.

6. In a valve operating mechanism, a push rod comprising inner and outer relatively movable sleeves, means carried by the inner sleeve to engage the stem of a valve, yieldable means to force the inner sleeve outward, a plurality of relatively movable rings having inclined edges and defining annular grooves, balls within the grooves, a grooved cam engaging the push rod to actuate the latter to open the valve, a stem movable within the push rod and controlled by the pressure of the spring of the valve during the opening movement of the latter to engage certain of the balls and move said balls outward and position the rings to hold the inner sleeve against inward movement, means included in the ball engaging stem to lock the rings in position and means included in the grooved cam to actuate said stem and release the rings during the operation of the valve.

In testimony whereof I affix my signature.

JOSEPH BENJAMIN LIEVRE.